US007761226B1

(12) United States Patent
Rashid (10) Patent No.: US 7,761,226 B1
(45) Date of Patent: Jul. 20, 2010

(54) INTERACTIVE PEDESTRIAN ROUTING SYSTEM

(75) Inventor: Fazal A. Rashid, Newark, DE (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1215 days.

(21) Appl. No.: 11/193,657

(22) Filed: Jul. 27, 2005

(51) Int. Cl.
*G06F 17/00* (2006.01)
(52) U.S. Cl. ............ 701/202; 709/219; 726/3; 726/27; 463/42
(58) Field of Classification Search ............ 701/202; 709/227, 225, 219; 726/15, 3, 27; 463/42; *G06F 17/00*
See application file for complete search history.

(56) References Cited

U.S. PATENT DOCUMENTS

| | | |
|---|---|---|
| 3,961,435 A | 6/1976 | Keckler |
| RE32,115 E | 4/1986 | Lockwood et al. |
| 4,817,043 A | 3/1989 | Brown |
| 4,974,170 A | 11/1990 | Bouve et al. |
| 5,170,165 A | 12/1992 | Iihoshi et al. |
| 5,184,303 A | 2/1993 | Link |
| 5,289,572 A | 2/1994 | Yano et al. |
| 5,559,707 A | 9/1996 | DeLorme et al. |
| 5,842,145 A | 11/1998 | Zimmer |
| 5,847,663 A | 12/1998 | Chasek |
| 5,944,769 A | 8/1999 | Musk et al. |
| 6,119,065 A | 9/2000 | Shimada et al. |
| 6,148,260 A | 11/2000 | Musk et al. |
| 6,259,990 B1 | 7/2001 | Shojima et al. |
| 6,266,614 B1 | 7/2001 | Alumbaugh |
| 6,266,615 B1 | 7/2001 | Jin |
| 6,278,938 B1 | 8/2001 | Alumbaugh |
| 6,349,257 B1 | 2/2002 | Liu et al. |
| 6,401,035 B2 | 6/2002 | Jin |
| 6,405,123 B1 | 6/2002 | Rennard et al. |

(Continued)

OTHER PUBLICATIONS

*Basic Military Requirements*, NAVEDTRA 14325, United States Navy, Nonresident Training Course, Naval Education and Training Professional Development and Technology Center, (NETPDTC), Pensacola, Florida, Feb. 2002, Chapter 8, entitled "Ship/Aircraft Characteristics," two front pages, pp. i to iii, and pp. 8-1 to 8-26 (31 pages total).

(Continued)

*Primary Examiner*—Tuan C To
(74) *Attorney, Agent, or Firm*—Howard Kaiser (57) ABSTRACT

The present invention's network-based directions-provision methodology typically features the establishment of two ranking schemes that reversely parallel each other. The "personal" ranking scheme ranks all permitted persons in terms of the degree of access permission with respect to the variously ranked regions of a facility; the lower the personal rank, the fewer the regional ranks to which the person is permitted access. The "regional" ranking scheme ranks all accessible regions in terms of the degree of access permission with respect thereto by the variously ranked permitted persons; the higher the regional rank, the fewer the personal ranks that are permitted access to the region. According to typical inventive practice, a permitted person logs in to request directions, within the facility, from an original location to a destination location; the directions given (textual and/or graphical) are the optimal directions that are consistent with the personal rank of the requestor.

20 Claims, 8 Drawing Sheets

U.S. PATENT DOCUMENTS

| | | | |
|---|---|---|---|
| 6,484,092 | B2 | 11/2002 | Seibel |
| 6,487,495 | B1 | 11/2002 | Gale et al. |
| 6,526,351 | B2 | 2/2003 | Whitham |
| 6,539,080 | B1 | 3/2003 | Bruce et al. |
| 6,542,811 | B2 | 4/2003 | Doi |
| 6,574,549 | B2 | 6/2003 | Cato et al. |
| 6,622,088 | B2 | 9/2003 | Hood |
| 6,662,106 | B2 | 12/2003 | Evans |
| 6,687,608 | B2 | 2/2004 | Sugimoto et al. |
| 6,694,124 | B2 | 2/2004 | Siders et al. |
| 6,765,998 | B2 | 7/2004 | Bruce et al. |
| 6,801,763 | B2 | 10/2004 | Elsey et al. |
| 6,842,695 | B1 | 1/2005 | Tu |
| 6,985,946 | B1 * | 1/2006 | Vasandani et al. ........... 709/225 |
| 7,304,586 | B2 * | 12/2007 | Wang et al. ............ 340/870.02 |
| 7,325,014 | B1 * | 1/2008 | Kennedy ........................... 1/1 |
| 7,346,696 | B2 * | 3/2008 | Malik ......................... 709/229 |
| 7,370,366 | B2 * | 5/2008 | Lacan et al. .................. 726/28 |
| 7,508,767 | B2 * | 3/2009 | Shinomiya .................. 370/242 |
| 2002/0055872 | A1 * | 5/2002 | LaBrie et al. ................. 705/14 |
| 2003/0014529 | A1 * | 1/2003 | Simpson et al. ............. 709/229 |
| 2003/0158914 | A1 * | 8/2003 | Satomi et al. ............... 709/219 |
| 2003/0167317 | A1 * | 9/2003 | Deen et al. ................... 709/219 |
| 2004/0024845 | A1 * | 2/2004 | Fishhaut et al. ............. 709/219 |
| 2006/0224967 | A1 * | 10/2006 | Marmaros ................... 715/738 |

OTHER PUBLICATIONS

The Bluejackets' Manual, 19$^{th}$ Edition, United States Naval Institute, Naval Institute Press, Annapolis, Maryland, 1973, cover page and publication page (two pages total).

The Bluejackets' Manual, 19$^{th}$ Edition, United States Naval Institute, Naval Institute Press, Annapolis, Maryland, 1973, Chapter 5, entitled "Uniforms," pp. 55-76.

The Bluejackets' Manual, 19$^{th}$ Edition, United States Naval Institute, Naval Institute Press, Annapolis, Maryland, 1973, Chapter 6, entitled "Classification and Ratings," pp. 77-96.

The Bluejackets' Manual, 19$^{th}$ Edition, United States Naval Institute, Naval Institute Press, Annapolis, Maryland, 1973, Chapter 8, entitled "Ship Construction and Operation," pp. 140-162.

*Principles of Naval Engineering*, NAVPERS 10788-B, Revised Edition, prepared by the Bureau of Naval Personnel, Superintendent of Documents, U.S. Government Printing Office, Washington, DC, 1970, cover page (1 page).

*Principles of Naval Engineering*, NAVPERS 10788-B, Revised Edition, prepared by the Bureau of Naval Personnel, Superintendent of Documents, U.S. Government Printing Office, Washington, DC, 1970, Chapter 2, entitled "Ship Design and Construction," pp. 15-33.

VIRTOOL website home page, http://www.virtool.com/, 1 page printed out on Jun. 23, 2005.

MapQuest website home page, http://www.mapquest.com/, 1 page printed out on Nov. 16, 2005.

MapQuest website driving directions page, http://www.mapquest.com/directions/, 2 pages printed out on Nov. 15, 2005.

Yahoo maps website homepage, http://www.maps.yahoo.com/, 2 pages printed out on Nov. 15, 2005.

Yahoo maps website driving directions page, http://www.maps.yahoo.com/dd, 2 pages printed out on Nov. 15, 2005.

Rand McNally website home page, http://www.randmcnally.com/, 1 page printed out on Nov. 15, 2005.

Rand McNally website online driving directions page, http://www.randmcnally.com/rmc/directions/dirGetDirectionsInput.jsp, 3 pages printed out on Nov. 15, 2005.

* cited by examiner

INTERACTIVE PEDESTRIAN ROUTING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to travel routes, more particularly to methodologies for providing directions for traveling within a place or premises.

According to current U.S. Navy practice, when a new sailor reports aboard a ship, he or she is assigned a designee (sometimes referred to as a "sponsor") to facilitate acclimation of the new sailor to his or her new surroundings. The sponsor typically is of the same "rate" as the new sailor, and may also work in the same division or workspace as the new sailor. Notwithstanding the effectiveness of the current system of orienting and indoctrinating new sailors, in which a sponsor personally takes a new sailor under the sponsor's wing, the current system can also result in wasted manpower. During the period of orientation and indoctrination, which may run well over a month, the sponsor may spend large amounts of time guiding and mentoring the sailor. While some of this time is time well spent, a significant portion of this time is time wasted—time that would be better spent by the sponsor on his or her other responsibilities. Each man-hour spent in new sailor indoctrination-orientation constitutes a man-hour away from the primary duty station. Furthermore, decreases in time that sponsors spend on particular tasks tend to necessitate increases in time that other personnel spend on such tasks.

A naval ship is large, complex and populous facility containing numerous areas and spaces. At any time onboard the ship, many pedestrians are negotiating the areas and spaces in order to get from one location to another. Navigating the labyrinthic interior of the ship can be difficult for sailors who are unfamiliar with the ship, and is often no simple matter even for sailors who are familiar with the ship. Common time-inefficient endeavors for sponsors involve directing and/or accompanying new sailors between various locations onboard the ship. In addition to Navy sailors, various other categories of people (e.g., non-Navy military personnel, government civilian employee personnel, government contractor personnel), on temporary onboard assignment, may require navigational assistance. Similar considerations as discussed hereinabove with regard to ships may apply to land-based facilities such as buildings, installations, complexes and stadiums. The desirability is manifest for a methodology of facilitating travel of an unacclimated person from one location to another in the confines of a ship or other facility without unduly occupying an acclimated person's time.

SUMMARY OF THE INVENTION

In view of the foregoing, it is an object of the present invention to provide method, system and computer program product for directing people who require pedestrian travel routing between various locations within a facility such as a ship.

According to typical inventive practice, a method for determining a route in a facility comprises: (a) providing a database that includes plural persons that are permitted to occupy a facility and plural regions that are accessible in the facility; and, (b) based on the database, determining a path for a person from a first location of the facility to a second location of the facility. In the database, each person has associated therewith a personal clearance level; each region has associated therewith a regional clearance level. There are plural personal clearance levels corresponding to plural regional clearance levels. Each regional clearance level represents the minimum personal clearance level that is permitted access to the region with which the regional clearance level is associated. Each personal clearance level represents the maximum regional clearance level to which is permitted access the person with which the personal clearance level is associated. Associated with every region that the path at least partially intersects is a regional clearance level that is no greater than the personal clearance level associated with the person for whom the path is being determined. According to some inventive embodiments, the determination of a path includes a preliminary finding of two or more paths that meet the foregoing inventive standard, and a final selection among them of the single path that best conforms (e.g., in terms of average regional clearance level characterizing the path) with the personal clearance level associated with the person for whom the path is being determined.

As typically embodied, the present invention is a web-based tool for providing walking directions for people traveling within the parameters of a facility that is subject to one or more restrictions. A prime example of a restricted access facility is a U.S. Navy ship, which usually has onboard many Navy military people (including officers and enlisted personnel) along with some people who are not Navy military. The present invention typically provides an interactive shipboard client-server computer network that includes a server and multiple clients. The server is a central computer having inventive software installed therein for processing direction requests by persons using client computers. A person makes a directions inquiry from a client computer by typing in his/her username and password, a starting onboard location and an ending onboard location. The clients can include workstation computers (e.g., for Navy personnel) and/or specially dedicated "direction-finder" computers that are strategically stationed at various locations onboard the ship. The client computer displays textual and/or graphic directions, originating from the server, that can be printed out by the client computer user. Various computer program products in accordance with the present invention can be made available (e.g., on compact disc) for installation, as would be suitable for creating and/or maintaining the present invention's network. Although the present invention is typically practiced so as to implement a computer network (e.g., interne or intranet), the present invention can also be practiced utilizing one or more computer program products (e.g., residing on one or more compact discs) in the absence of networking requirement or capability. For instance, inventive direction-giving cd-roms can be distributed to facility personnel in accordance with personal clearance level, wherein a different cd-rom edition (entitled, e.g., "VIP Edition," "Manager Edition," "Employee Edition") is issued for each personal clearance level.

The present invention thus advantageously promotes the independence of persons who are unfamiliar with a facility. As long as the directions are clear and the unacclimated new person fully appreciates that certain areas and spaces are off-limits to him or her, there is a tremendous upside to encouraging the self-reliance of the unacclimated person. Moreover, practice of the present invention is not relegated to restricted access facilities, but is possible for any facility.

Inventive practice can be especially propitious for a restricted access facility, since such a facility already has in place a logical basis for distinguishing between or among two or more categories of people, for instance due to security concerns. Inventive practice can nevertheless prove useful for a facility that is not a restricted access facility, for instance in furtherance of alleviating pedestrian traffic congestion inside a facility. The present invention can serve as an effective traffic engineering tool for regulating the flow of pedestrian traffic, regardless of whether the inventive clearance level designations are logical, arbitrary or some combination thereof. Furthermore, inventive principles are applicable not only to pedestrian travel but also to vehicular travel. For instance, there may be large numbers of pedestrians and vehicles (e.g., forklifts) that are concurrently moving about throughout a large and intricate factory complex.

The term "facility," as used herein, broadly refers to any place or premises—for instance, all or part of a building, structure, edifice, factory, installation, complex, stadium, vehicle or vessel. The term "restricted access facility," as used herein, broadly refers to any facility that contains one or more areas or spaces to which access is restricted. A space or area is "accessible" if it is physically capable of being reached or entered. "Restricted" access to a space or area suggests lack of permission to access such space or area with regard to at least one person or at least one group. Restricted access usually entails permission of access with respect to some people and non-permission (e.g., denial) of access with respect to other people. Access to a space or area is "restricted," for instance, if one or more groups of people are not authorized to reach or enter the space or area. The term "clearance," as used herein, is a general term meaning permission to proceed.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 4, FIG. 5 and FIG. 6 are examples of web pages as they might appear to a user of a client computer that is part of a web-based (e.g., interne or intranet) client-server networked system in accordance with the present invention as typically embodied.

FIG. 4 portrays an introductory page on which the user can log in/on.

DETAILED DESCRIPTION OF THE INVENTION

Figure 1:
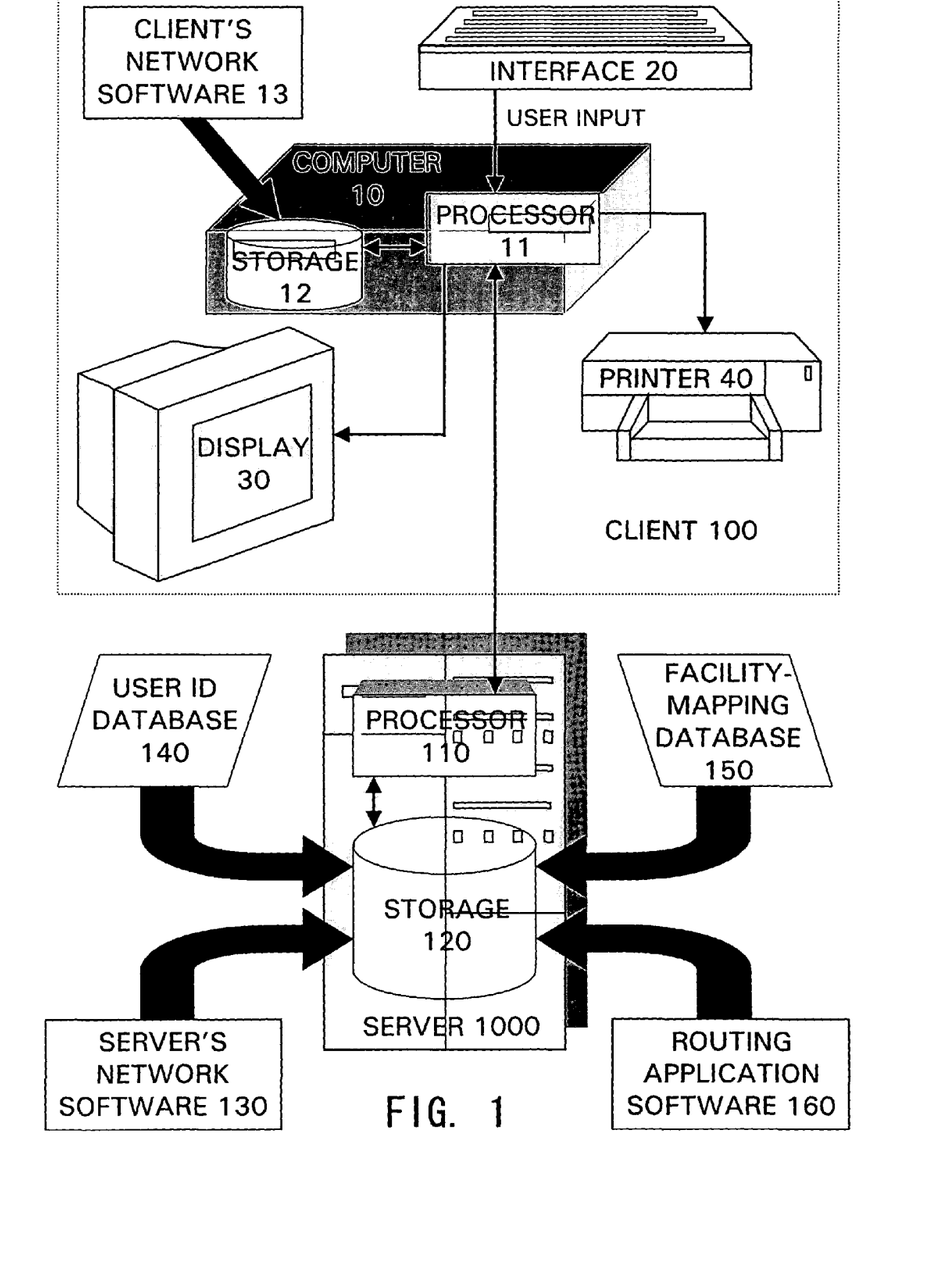
FIG. 1 is a schematic of an interactive client-server network as typically embodied in accordance with the present invention. Although a single client is depicted in FIG. 1 for illustrative purposes, it is to be understood that any number of such clients can be included in the inventive network, each client being connected to the server in the manner shown.

Referring now to FIG. 1, a typical computer-networked system in accordance with the present invention includes a server 1000 and multiple clients 100. Server 1000 includes a processor 110 and a storage device 120. Each client 100 includes a computer 10 (which includes a processor 11 and a storage device 12), an interface unit 20 (which includes a keyboard and a mouse), a display 30 and a printer 40. Installed in each client 100's storage 12 and in server 1000's storage 120 are client's network software 13 and server's network software 130, respectively, which together enable communication between each client 100 and server 1000 in the context of the inventive networked system. Also installed in server 1000's storage 120 are a user identification (ID) database 140, a facility-mapping database 150, and routing application program 160. The present invention's routing application software 160 includes provision for interactive communication (including logging in, requesting directions, and providing directions, all via a directions website) and directions determination (including processor access to user ID database 140 and facility-mapping database 150).

Figure 2:
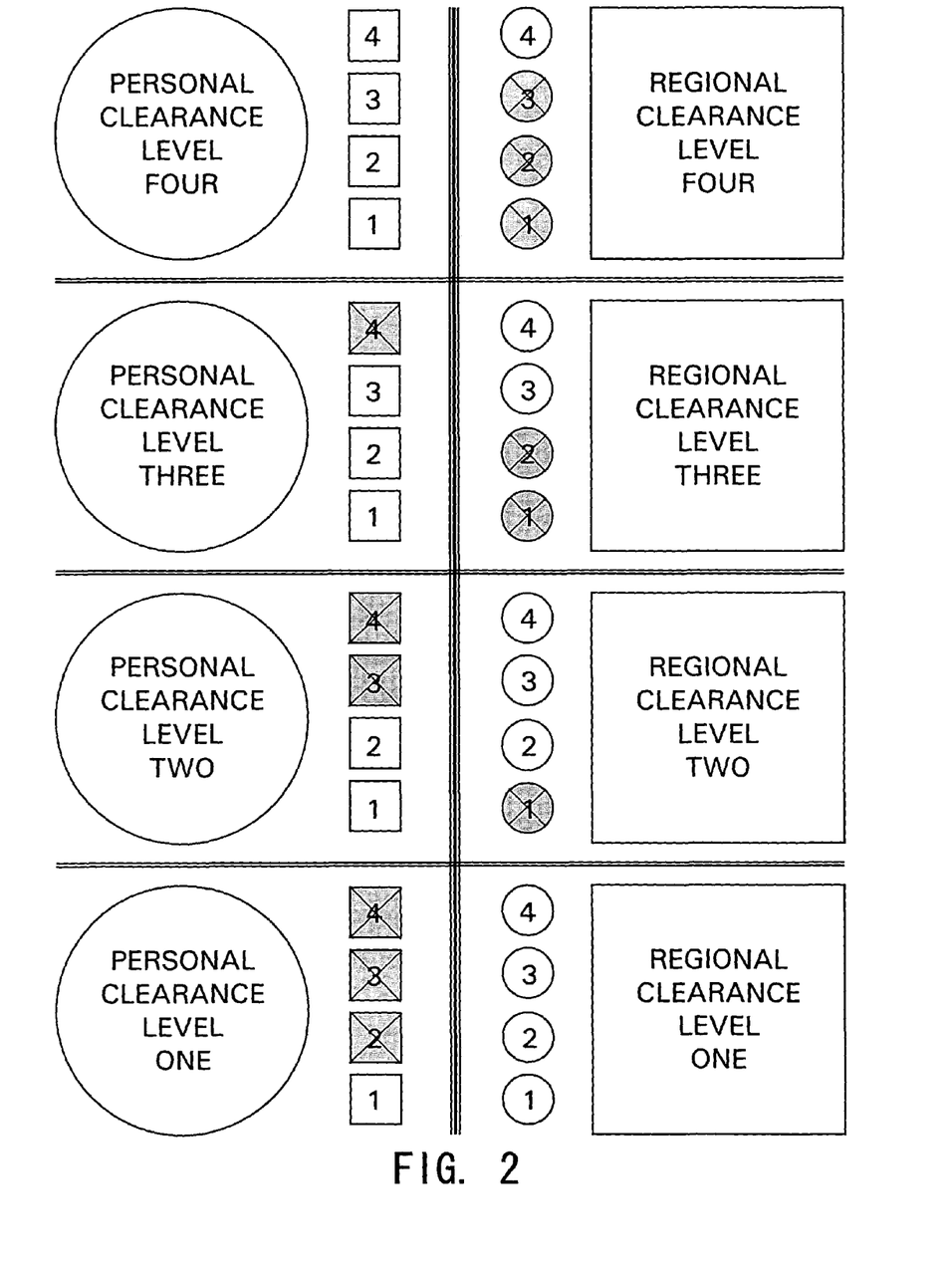
FIG. 2 is a diagrammatic representation of two equivalent sets of four clearance levels, viz., a set of four personal clearance levels and a set of four regional clearance levels. The two sets are shown juxtaposed in FIG. 2. As further illustrated in FIG. 2, each personal clearance level is characterized by permission of access to the regional clearance level of the same level number or smaller. Conversely, each regional clearance level is characterized by permission of access by the personal clearance level of the same level number or greater.

With reference to FIG. 2, a fundamental aspect of the present invention is the provision of two equivalent but converse clearance level hierarchies, viz., a personal clearance level hierarchy (represented in the lefthand column of FIG. 2) and a regional clearance level hierarchy (represented in the righthand column of FIG. 2). The personal clearance level hierarchy pertains to the authorized occupants of the facility, who are described in user ID database 140 in terms of username, password and personal clearance level. The regional clearance level hierarchy pertains to the layout and regions of the facility itself, which are described in facility-mapping database 150 in terms of region, region location, region dimensions and regional clearance level. The personal clearance level hierarchy and the regional clearance level hierarchy are characterized by converse access (e.g., entry) permissibility schemes.

To elaborate, as shown in FIG. 2, personal clearance level four (the highest personal clearance level) is followed by personal clearance level three (the second highest personal clearance level), which is followed by personal clearance level two (the third highest personal clearance level, which is followed by personal clearance level one (the lowest and fourth highest personal clearance level). In parallel fashion, regional clearance level four (the highest regional clearance level) is followed by regional clearance level three (the second highest regional clearance level), which is followed by regional clearance level two (the third highest regional clearance level, which is followed by regional clearance level one (the lowest and fourth highest regional clearance level). Some people are attributed with personal clearance level four, some people are attributed with personal clearance level three, some people are attributed with personal clearance level two, and some people are attributed with personal clearance level one. Similarly, some regions are attributed with regional clearance level four, some regions are attributed with regional clearance level three, some regions are attributed with regional clearance level two, and some regions are attributed with regional clearance level one.

A personal clearance level four person is permitted access to all regions at any of the four regional clearance levels, viz., any regional clearance level four region, any regional clearance level three region, any regional clearance level two region, and any regional clearance level one region. A personal clearance level three person is permitted access to all regions at three of the four regional clearance levels, viz., any regional clearance level three region, any regional clearance level two region, and any regional clearance level one region. A personal clearance level two person is permitted access to all regions at two of the four regional clearance levels, viz., any regional clearance level two region and any regional clearance level one region. A personal clearance level one person is permitted access to all regions at one of the four regional clearance levels, viz., any regional clearance level one region.

As compared with the permissions associated with the personal clearance levels, the permissions associated with the regional clearance levels operate in a reverse manner. A regional clearance level one region permits access to all persons at all four personal clearance levels, viz., any personal clearance level four region, any regional clearance level three region, any regional clearance level two region, and any regional clearance level one region. A regional clearance level two region permits access to all persons at three of the four personal clearance levels, viz., any personal clearance level four person, any personal clearance level three person, and any personal clearance level two person. A regional clearance level three region permits access to all persons at two of the four personal clearance levels, viz., any personal clearance level four person, and any personal clearance level three person. A regional clearance level four region permits access to all persons at one of the four personal clearance levels, viz., any personal clearance level four person.

According to typical inventive practice, user ID database 140 contains identifying information (e.g., full name, date of birth, place of birth, military rank, civilian government employment grade, contractor employment information, assignment or detail, and/or security clearance), along with the user name (username) and password, for every individual who is permitted to be present within the confines of the ship or other facility. The password can be changed (e.g., periodically) on the initiative of the user or at the instance of the server's network software 130. For U.S. Navy ships, an efficient approach to compiling ship-mapping database 150 may include adoption of the U.S. Navy's uniform system of ship compartment designations, in accordance with which every ship is identifiably compartmentalized (regionalized). The existing designations for the compartments (regions) 151 onboard the ship can be incorporated into database 150.

The U.S. Navy's compartment designation system assigns to every space (except certain minor spaces) a compartment designation consisting of three numerical symbols and a letter symbol that are separated by dashes. Each compartment designation is displayed (e.g., in photoluminescent paint) on a label plate referred to by Navy sailors as a "bulls-eye." Each bulls-eye is attached to a door, bulkhead or hatch of the corresponding compartment 151. According to the U.S. Navy's compartment designation system, a compartment designation consists of: (i) a deck number (e.g., main deck, second deck, third deck, etc.); (ii) a frame number, indicating the relationship of the compartment relative to the bow of the ship in a longitudinal direction; (iii) a port-versus-starboard number, indicating the relationship of the compartment relative to the centerline in a transverse direction (wherein even numbers pertain to port side compartments and odd numbers pertain to starboard side compartments); and, (iv) a letter (or double letter) indicating the use of the compartment (e.g., "A" for stowage spaces, "AA" for cargo holds, "C" for control centers such as CIC, "L" for living spaces, etc.). For instance, according to the compartment designation "04-79-1-C," the number "04" indicates the fourth deck above the main deck (which is indicated by the number "1"), the number "79" indicates frame number 79, the number "1" indicates the first compartment to starboard side, and the letter "C" indicates compartment use as a control center. A deck number of "3," for example, indicates the third deck (i.e., two decks below the main deck, which is deck number "1"). A centerline relationship number of "2" indicates the first compartment to port side. See, e.g., *Basic Military Requirements*, NAVEDTRA 14325, United States Navy, Nonresident Training Course, Naval Education and Training Professional Development and Technology Center, (NETPDTC), Pensacola, Fla., February 2002, Chapter 8 ("Ship/Aircraft Characteristics"), pages 8-11 to 8-13; The Bluejackets' Manual, 19$^{th}$ Edition, United States Naval Institute, Naval Institute Press, Annapolis, Md., 1973, Chapter 8 ("Ship Construction and Operation"), pages 144-147; *Principles of Naval Engineering*, NAVPERS 10788-B, Revised Edition, prepared by the Bureau of Naval Personnel, Superintendent of Documents, U.S. Government Printing Office, Washington, D.C., 1970, Chapter 2 ("Ship Design and Construction"), pages 26-29.

By way of illustration of inventive practice associated with a U.S. Navy ship, a personal clearance hierarchy might be established along the lines of the following. Personal clearance level four designees are U.S. Navy personnel of rank E5 or above, or other U.S. military personnel of rank equivalent to E5 or above. Personal clearance level three designees are U.S. Navy personnel of rank E4 or below, or other U.S. military personnel of rank equivalent to rank E4 or below. Personal clearance level two designees are U.S. government employees or representatives who do not require an escort, or contractor employees or representatives who do not require an escort. Personal clearance level one designees are civilians to whom personal clearance level two does not apply (e.g., non-U.S. Government civilians, non-contractor civilians) and who do not require an escort. Personal clearance level four designees are permitted access to regional clearance level four compartments 151. Personal clearance level four designees and personal clearance level three designees are permitted access to regional clearance level three compartments 151. Personal clearance level four designees, personal clearance level three designees, and personal clearance level two designees are permitted access to regional clearance level two compartments 151. All authorized individuals (i.e., personal clearance level four designees, personal clearance level three designees, personal clearance level two designees, and personal clearance level one designees) are permitted access to regional clearance level one compartments 151. The variations are endless for configuring the personal clearance and regional clearance classification schemes. Factors such as governmental, military or company security clearance (e.g., top secret security clearance, secret security clearance, confidential security clearance) can be incorporated into the personal and regional clearance regimes.

Figure 3A:
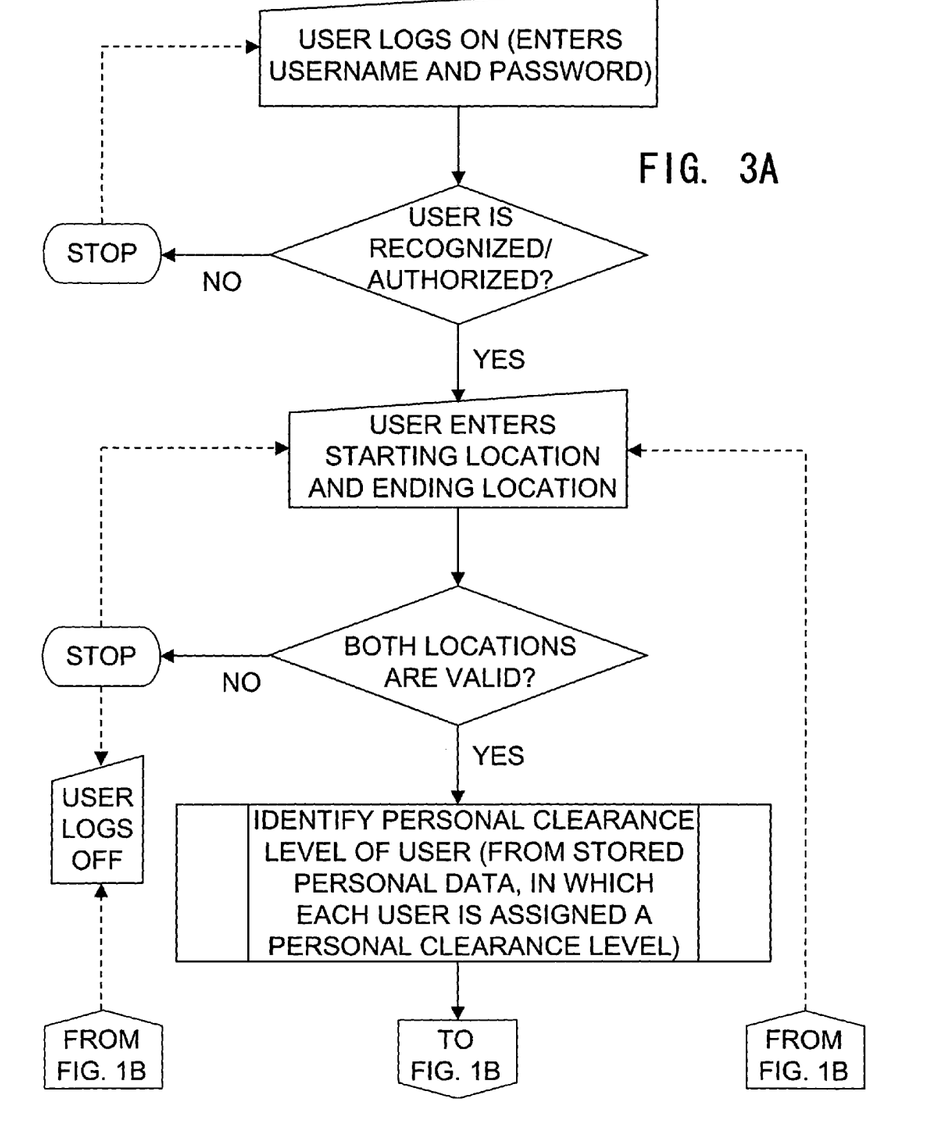
FIG. 3A and FIG. 3B together constitute a flow diagram of an interactive method, as typically embodied in accordance with the present invention, for providing directions for an inquiring individual from one location to another within the parameters of a facility such as a restricted access facility.
Figure 3B:
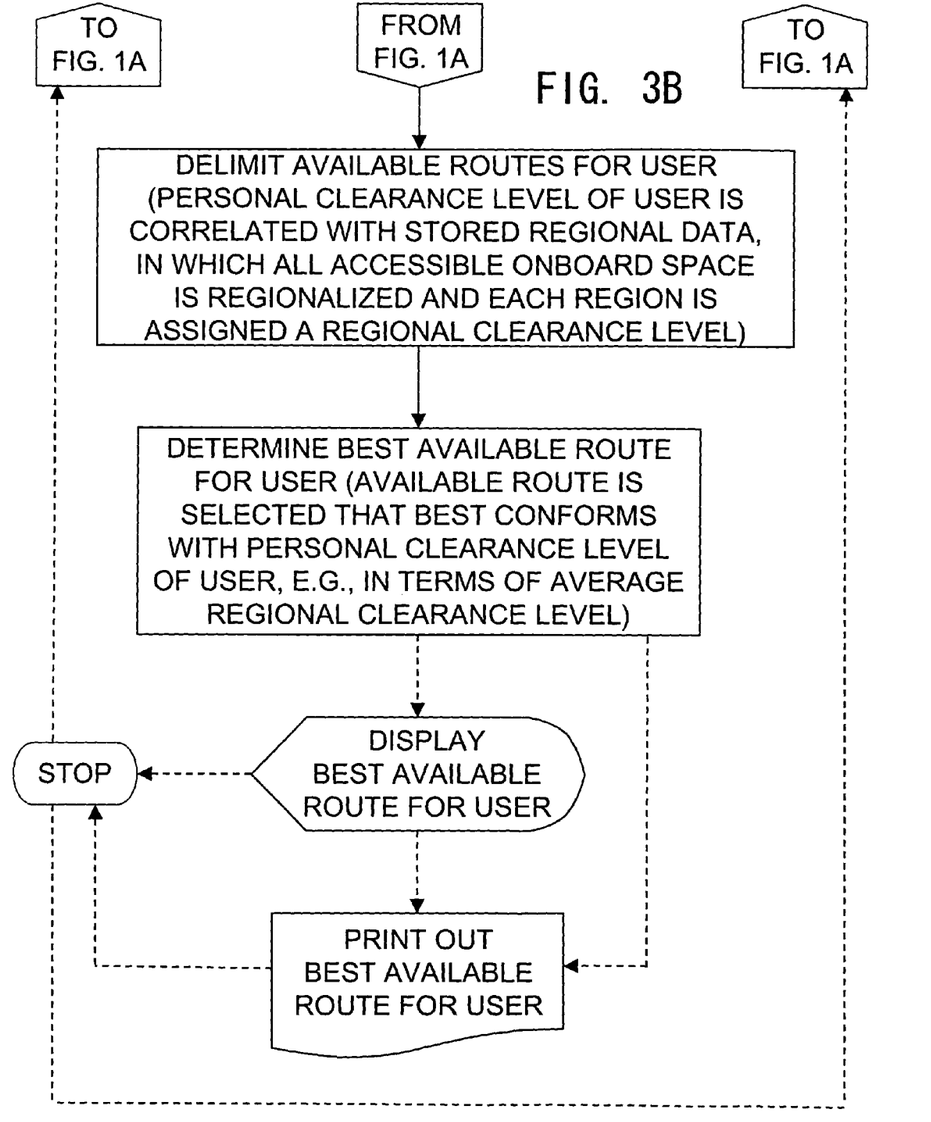
Figure 4:
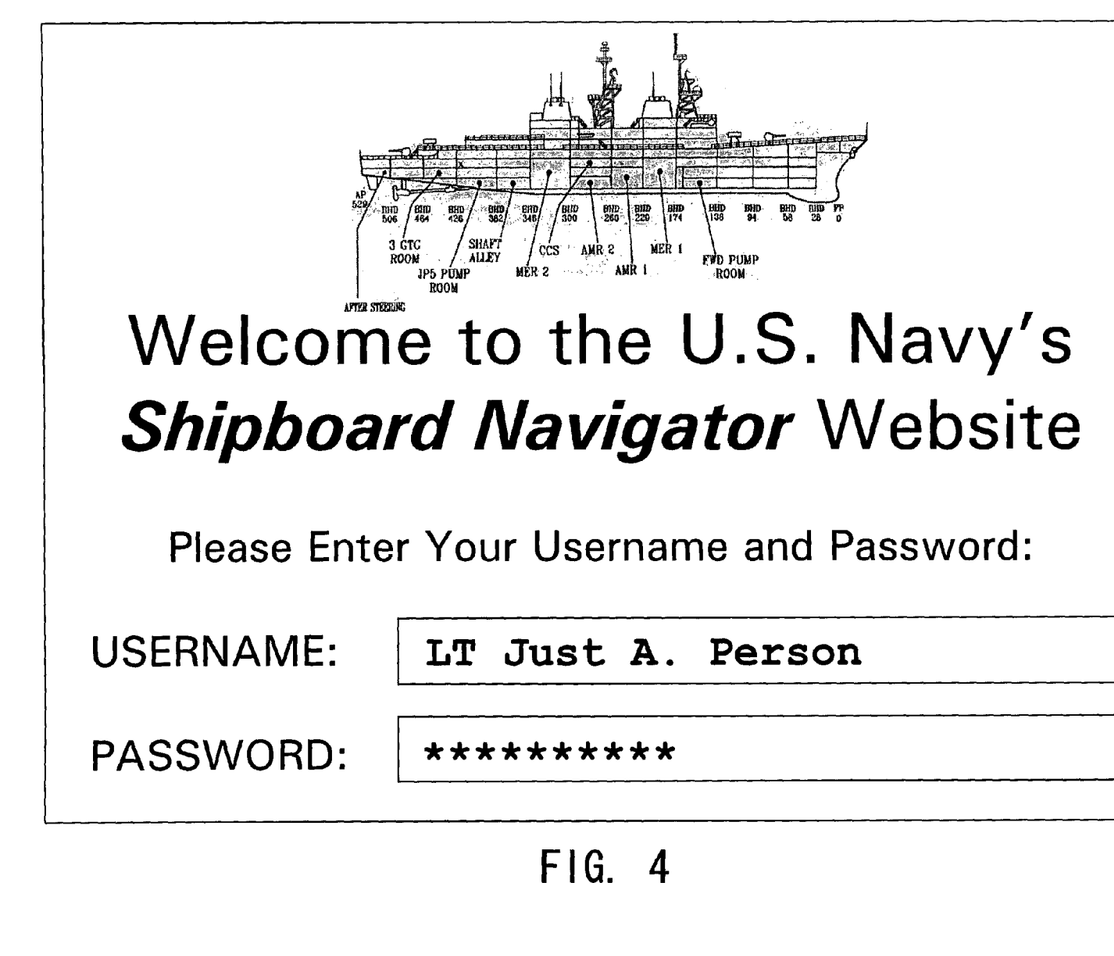
Figure 5:
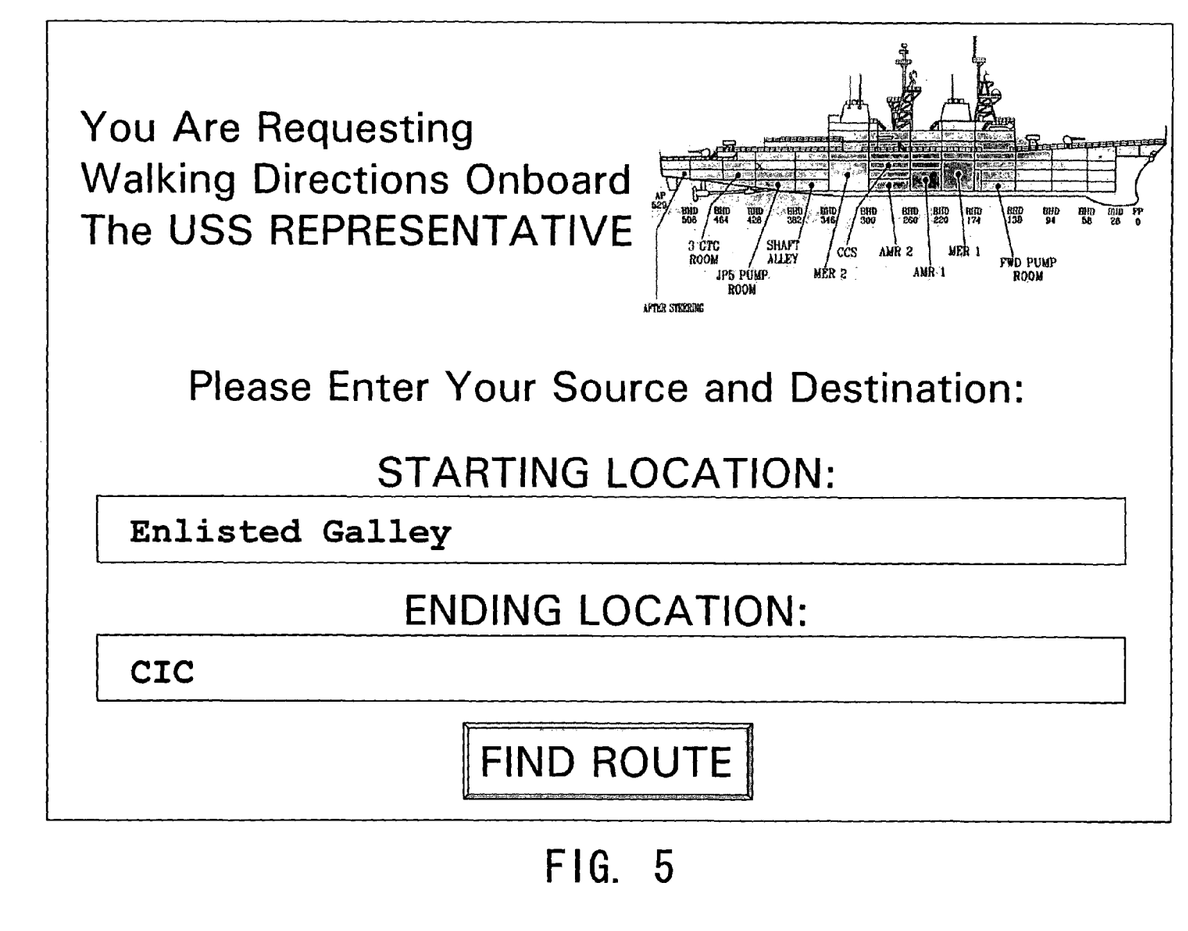
FIG. 5 portrays a directions request page on which the logged in/on user (logged in/on via FIG. 4) indicates a starting location and an ending location.

Still referring to FIG. 1 and FIG. 2, reference is also made to FIG. 3A, FIG. 3B, FIG. 4, FIG. 5, FIG. 6 and FIG. 7. As illustrated in FIG. 3A, the user logs on (logs in) to the inventive website by entering (using interface 20) his/her username and password at the website's home (or main) page, such as depicted in FIG. 4. The user is properly logged on provided that the routing application program 160, looking to user ID database 140, accepts both the user's username and the user's password. Once logged on, the user requests directions by entering (using interface 20) a starting location and an ending location at the website's directions request page, such as depicted in FIG. 5. When both the starting location and the ending location are accepted by application program 160 as being contained in facility-mapping database 150, application program 160 continues through its directions-determination logic as illustrated in FIG. 3B.

Figure 6:
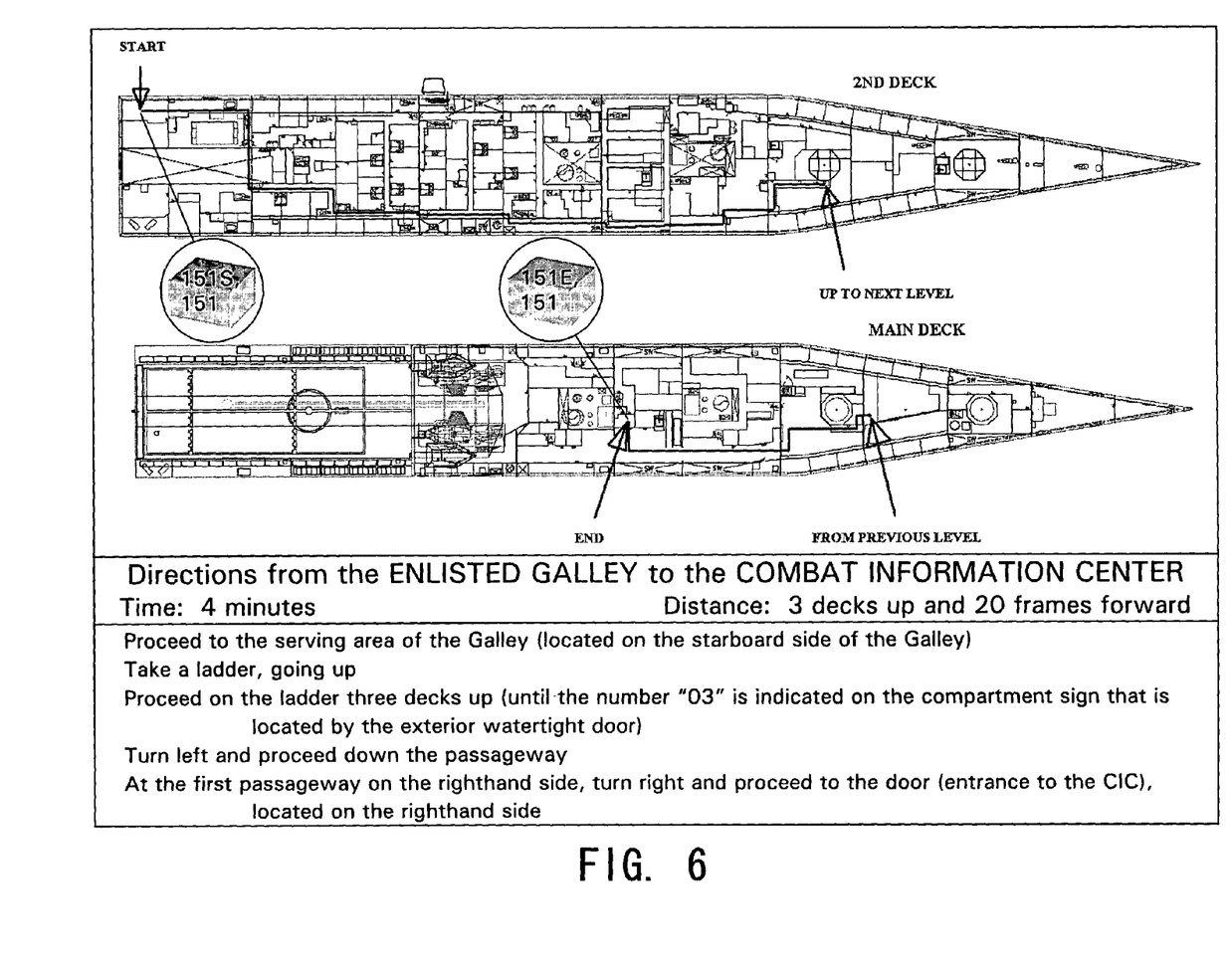
FIG. 6 portrays a directions provision page (responsive to the directions request via FIG. 5), which the logged in/on user can view and, optionally, print out.

As depicted in FIG. 4 through FIG. 6, the user is a Navy officer requesting directions from the Enlisted Galley to the Combat Information Center (CIC). The directions shown in FIG. 6 are in the form of written step-by-step instructions accompanied by two plan views, viz., of two adjacent ship decks. A bold path line traces the route from the starting location (compartment 151S, which the Enlisted Galley includes) and the ending location (compartment 151E, which the CIC includes). Compartments 1515 and 151E, indicated in FIG. 6, are but two of numerous compartments 151 that are contained in ship-mapping database 150. The insets containing compartments 151S and 151E, shown in FIG. 6, are for illustrative purposes and are not part of the display screen (viewable by the user) in FIG. 6. In database 150, with the exceptions of certain minor spaces (e.g., some closets), all onboard space (or all accessible onboard space) is regionalized/compartmentalized; each region/compartment is assigned a minimum permissible clearance level, below which access is denied.

There are diverse types of graphic displays that are possible in inventive practive for communicating the directions to the user. Although plan views are provided to the user as depicted in FIG. 6, inventive practice admits of the possibility of one or more plan views, elevation views and/or perspective views, in any combination, and of any portion of (e.g., a single deck or a group of longitudinal frames) or the entirety of the ship. In addition, some inventive embodiments provide for a kind of "virtual reality tour" whereby the user views, on the display screen, a dynamic rendering of the pedestrian route from the starting location to the ending location. For instance, upon the completion and entering of the user's directions request such as shown in FIG. 5, the display screen splits and the user views a visual walk through the route from the starting location to the ending location; once the visual walk is completed the user may have the option of repeating the visual walk or may log off. If the user does nothing, the computer can wait a period of time and then reset itself for the next person.

Figure 7:
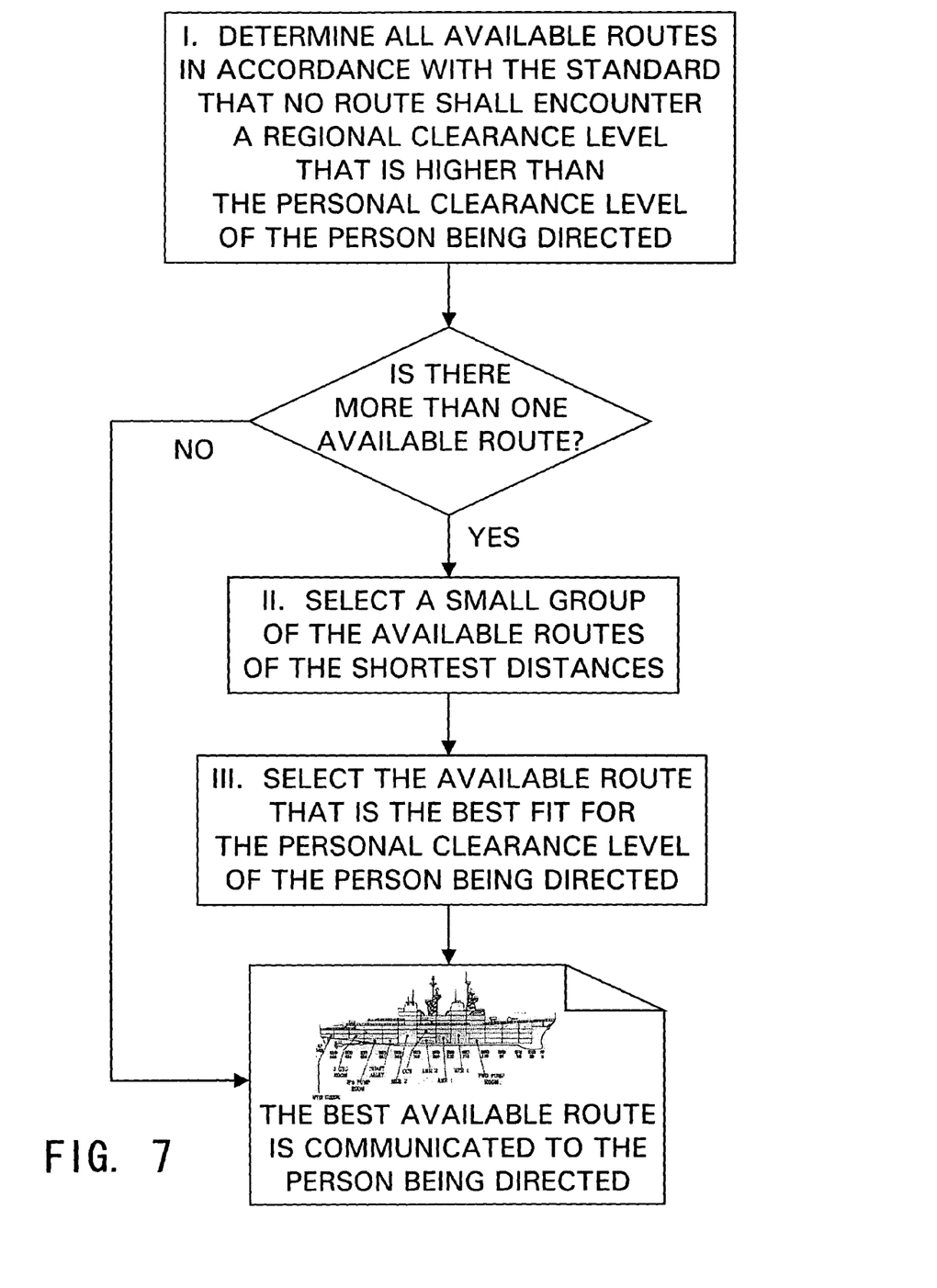
FIG. 7 is a flow diagram illustrating how the "best available route" is selected in accordance with some embodiments of the present invention.

The user is identified, from user ID database 140, as having a particular personal clearance level. For instance, taking the example shown in FIG. 2, every user contained in user ID database 140 is designated as having either personal clearance level four, or personal clearance level three, or personal clearance level two, or personal clearance level one. In accordance with the personal clearance level of the user, application program 160 delimits the scope of possibilities of "available" routes—i.e., routes that are permitted to be taken by the user. An "available" route is a route that connects the starting and ending locations and that only touches regions having a regional clearance level that is equal to or less than the personal clearance level of the user. Application program 160 goes on to determine the "best" available route for the user, which is exhibited by application program 160 on the website's directions provision page, such as depicted in FIG. 6. A typical inventive reasoning process of narrowing down the routing possibilities to a single "best" available route is illustrated in FIG. 7. The user views the directions on display 30, and/or prints out the directions using printer 40. The user also has the option of requesting directions for a different pair of starting and ending locations. When the user has completed his/her session, he/she logs off (logs out) from the website.

The generally preferred inventive approach is to communicate to the inquiring person a single route, although it is possible in inventive practice to design an inventive application program that communicates two or more routes, thus allowing the inquiring person the option of choosing the route to be taken. Inventive practice typically determines what is referred to herein as the "best available route," which is based on personal clearance and regional clearance information. In the expression "best available route," the adjectives "best" and "available" pertain to different aspects of an inventively determined route. An "available" route is any route that can be taken in accordance with basic inventive principles insofar as being consistent with a given person's personal clearance level and the regional clearance level scheme of the facility. As for finding which available route is "best," inventive practice can embody any of multifarious possible ways for reaching this decision. For instance, a server 100 can be inventively programmed to preliminarily determine all of the available routes, and to then finally determine which available route is the "best available route"; if there is only one available route, then the best available route has already been determined.

FIG. 7 represents but one example of this kind of multi-stage logic in accordance with the present invention. In Stage I, the inventive application program determines all of the available routes by applying the present invention's fundamental standard that no route shall encounter a regional clearance level that is higher than the personal clearance level of the person being directed. If more than one available route is found in stage I, the inventive application program proceeds to Stage II. In Stage II, the inventive application program applies a distance criterion, selecting, from among all of the available routes, a small number of (e.g., the two or three) available routes that are shortest in distance. An algorithmic cutoff can be applied to limit the number of available routes under consideration in terms of acceptable variation of distance. In Stage III, the program applies a "priority" criterion so as to choose a single route from among the two or three routes resulting from Stage II. According to this prioritization, the route selected is that which is most in comportment with the personal clearance level of the person being directed.

To illustrate by way of example the present invention's prioritized selection of a best available route, let us assume that the present invention attributes, to a company's large facility, four personal clearance levels and four matching regional clearance levels, viz., Levels, 4, 3, 2 and 1, in order from highest to lowest. Level 4 is the highest (most permissive) personal clearance level, reserved for corporate officers and VIPs. Level 3 is the second highest (second most permissive) personal clearance level, reserved for managerial personnel. Level 2 is the third highest (third most permissive) personal clearance level, reserved for non-managerial personnel. Level 1 is the lowest (least permissive) personal clearance level, reserved for visitors and guests. A Level 3 person goes online, seeking directions from the cafeteria to the tennis court. Stage I-through-Stage II reasoning by the inventive application program yields two alternative available routes, viz., Route A and Route B, as follows. Route A: cafeteria, to Level I region, to Level 2 region, to Level 2 region, to Level 3 region, to Level 3 region, to tennis court. Route B: cafeteria, to Level 1 region, to Level 1 region, to Level 1 region, to Level 2 region, to Level 2 region, to Level 2 region, to tennis court. A Level 2 person goes online seeking directions from the same starting point (cafeteria) to the same ending point (tennis court). The only available route that is determined for the Level 2 person via the inventive application program's Stage I reasoning is the above-noted Route B.

Continuing with this example, by various forms of reasoning Route A may be considered to be more suitable than Route B for the Level 3 person. Typically, the present invention's goal in Stage III is to select the "best-fit" route as the best available route; that is, Stage II selects, from among the Stage II-determined candidates for the best available route, the one route that is the very best "fit" for the person being directed in terms of that person's personal clearance level. Depending upon the inventive embodiment, this best-fit route is variously arrived at. Some inventive embodiments incorporate in some capacity, into the best-fit reasoning process, the premise that higher personal clearance level individuals should be permitted "better" routes than lower personal clearance level individuals. Inventive practice can be geared in various ways toward favoring the higher personal clearance level individual over the lower personal clearance level individual. More generally, a typical inventive strategy is to find routes that are commensurate with the personal clearance levels of the users. Nevertheless, not every pair of starting and ending locations will have mutually exclusive routes for every personal clearance level; that is, for given starting and ending locations, the inventively determined routes may vary, but will not necessarily vary, for two or more individuals having different personal clearance levels.

One inventive approach is to adopt, as the best-fit route, the available route in which the "average" regional clearance level is closest to the personal clearance level of the person being directed. This "average" regional clearance level can be, for example, the arithmetic mean of the regional clearance levels corresponding to the regions encompassed by the route. According to this rationale, Route A is characterized by an average regional clearance level of 11/5=2.2, whereas Route B is characterized by an average regional clearance level of 9/6=1.5. Alternatively, either the median or the mode can be taken of the pertinent regional clearance levels. As another alternative, for each of the candidates for best available route, an "average" is taken of the regional clearance levels along the overall distance (length) described by the route, with different percentages of the overall route distance/length being associated with different regional clearance levels.

Regardless of how the "average" of the regional clearance levels is inventively defined, this "average" is taken of the route between, but not including, the starting location (cafeteria) and the ending location (tennis court). Inventive incorporation of the notion of "average" regional clearance level might inherently serve to promote better inventive route selections for higher personal clearance level individuals. In a qualitative sense, the best-fit route often comes down to that route whose predominant regional clearance level best matches the personal clearance level of the person being directed. By affording the capability of applying a prioritization model of these types to all individual direction requests, inventive practice may serve to attribute balance to, or alleviate congestion of, pedestrian traffic patterns. In the above example, it is consistent with such objective if the Level 3 person and the Level 2 person are advised to take different routes from the same starting location (cafeteria) to the same ending location (tennis court); that is, the Level 3 person is directed along Route A, whereas the Level 2 person is directed along Route B.

Installation of an inventive system onboard a ship can be accomplished in several phases. By way of example, during an initial phase an AutoCAD layout of the ship is obtained using a three-dimensional (3D) computer tool such as VIRTOOL ("Virtual Reality for Machine-Tool"), an interactive application under development by a European consortium. VIRTOOL uses 3D graphics and virtual reality; see http://www.virtool.com/. A layout for a class of ship (e.g., a U.S. Navy ship class such as CG, CVN, etc.) may already be available in AutoCAD format, and this may lend itself to incorporation into the VIRTOOL rendering. Upon completion of the ship layout in 3D, the ship is mapped out using regional designations for all accessible locations, such as the aforenoted compartmental designations commonly used for U.S. Navy ships. For instance, correspondence is made or adopted between the CIC (Combat Information Center) and the compartmental designation "03-0-45-O." The personal and regional clearance level classification schemes are established, subject to the approval of the ship captain. In order that the ship maintain absolute control over who gains physical access to the ship and how deep the physical access is, a ship department is tasked with controlling user access to the inventive system; only the designated ship department grants the passwords and permissions. Once the inventive system is completely installed and tested onboard ship, the inventive system is ready for end use. The controlling department personnel are trained to operate and maintain the inventive system, including correcting any computer glitches that may arise.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A computer-networked system for giving directions for traveling between locations within a facility, said system comprising a plurality of clients and a server, said server being configured to:

establish two numerical scales, said numerical scales being an individual access permission status scale and a section access permissibility status scale, said scales pertaining to authorization of individuals to enter sections into which at least a portion of a facility is divided, said individual access permission status scale describing at least three individual access permission statuses that are assignable to said individuals, each said individual being assigned one said individual access permission status, said individual access permission statuses ranging from a numerically highest said individual access permission status $P_n$ to a numerically lowest said individual access permission status $P_1$, said individual access permission statuses being $P_n, P_{n-1}, \ldots P_1$, said section access permissibility status scale describing at least three section access permissibility statuses that are assignable to said sections, each said section being assigned one said section access permissibility status, said three section access permissibility statuses ranging from a numerically highest said section access permissibility status $R_n$ to a numerically lowest said section access permissibility status $R_1$, said section access permit statuses being $R_n, R_{n-1}, \ldots R_1$, wherein in parallel fashion said individual access permission statuses range between the highest said individual access permission status $P_n$ and the lowest said individual access permission status $P_1$ and said section access permissibility statuses range between the highest said section access permissibility status $R_n$ and the lowest said section access permissibility status $R_1$, the number n of said individual access permission statuses equaling the number n of said section access permissibility statuses, said individual access permission status being defined as authorizing access by said individual to every said section to which is assigned said section access permissibility status that is numerically equal to or numerically lower than said individual access permission status, said section access permissibility status being defined as authorizing access to said section by every said individual to which is assigned said individual access permission status that is numerically equal to or numerically higher than said section access permissibility status;

maintain two databases, said databases being an individual access permission status database and a section access permissibility status database, said individual access permission status database including identifications of said individuals and said individual access permission statuses that are assigned to said identified individuals, said section access permissibility status database including identifications of said sections and said section access permissibility statuses that are assigned to the identified said sections;

receive an inquiry from a said individual, using a said client, as to how to proceed from a first location of said facility to a second location of said facility; and determine a route for the inquiring said individual from said first location of said facility to said second location of said facility, wherein said individual access permission status that is assigned to said inquiring individual is numerically equal to or numerically higher than said section access permissibility status that is assigned to each said section that said route at least partially traverses, said route avoiding every said section to which is assigned said section access permissibility status that is numerically higher than said individual access permission status that is assigned to said inquiring individual.

2. The computer-networked system for giving directions of claim 1, wherein said facility is a restricted access facility, and wherein said route is for pedestrian travel.

3. The computer-networked system for giving directions of claim 1, wherein:
   said facility belongs to an organization having a plurality of organizational personnel;
   each said client includes a computer workstation for use by at least one said individual who is among said organizational personnel.

4. The computer-networked system for giving directions of claim 1, wherein each said client includes a computer that is dedicated to use by a said individual for making a said inquiry, and wherein said dedicated computers are selectively arranged in said facility for facilitating the making of said inquiries by said individuals.

5. The computer-networked system for giving directions of claim 1, wherein each said client includes a computer selected from the group consisting of desktop computer and dedicated computer, said desktop computer being for workstation use by a said individual who is a member of an organization that uses said facility, said dedicated computer being for specialized use by a said individual for making a said inquiry.

6. The computer-networked system for giving directions of claim 1, wherein:
   each said client is configured to communicate said inquiry to said server and to communicate the determined said route to the inquiring said individual;
   said identifications of said sections included in said section access permissibility status database convey the three-dimensional positions of said sections;
   the communication of the determined said route includes indication of said identification of each said section that said route at least partially traverses.

7. The computer-networked system for giving directions of claim 1, wherein said determination of said route includes:
   ascertainment of at least two preliminary said routes; and
   selection of the preliminary said route representing the best mathematical fit with respect to said individual access permission status that is assigned to said inquiring individual.

8. A computer-networked system for determining a route in a facility, said system comprising a plurality of clients and a server, said server being configured to:
   maintain a database having a progressive classification scheme associated with plural persons and plural regions, said progressive classification scheme including two numerical hierarchies, said numerical hierarchies being a personal clearance hierarchy and a regional clearance hierarchy and being applicable to said persons that are permitted to occupy a facility and said regions that are accessible in said facility, wherein in said database each said person is characterized by a personal clearance rank in said personal clearance hierarchy and each said region is characterized by a regional clearance rank in said regional clearance hierarchy, there being plural personal clearance ranks corresponding to plural regional clearance ranks, the total number of personal clearance ranks equaling the total number of regional clearance ranks, said personal clearance hierarchy and said regional clearance hierarchy being reversely related to each other in terms of permission of said persons to access said regions according to said personal clearance hierarchy versus permission of said regions to be accessed by said persons according to said regional clearance hierarchy, each said regional clearance rank representing the minimum said personal clearance rank that is permitted access to said region characterized by said regional clearance rank, each said personal clearance rank representing the maximum said regional clearance rank to which is permitted access said person characterized by said personal clearance rank, wherein no said person is permitted to enter any region characterized by said regional clearance rank that is higher than said person's personal clearance rank, and no said region is permitted to be entered by any person characterized by said personal clearance level that is lower than said region's regional clearance rank;
   determine a path for a said person using a said client, said path being from a first location of said facility to a second location of said facility, wherein characterizing every said region that said path at least partially intersects is said regional clearance rank that is no higher than said personal clearance rank characterizing said person for whom said path is determined, said path avoiding any said region characterized by said regional clearance rank that is higher than said personal clearance rank characterizing said person for whom said path is determined.

9. The computer-networked system for determining a route of claim 8, wherein said facility is a restricted access facility, and wherein said path is for pedestrian travel.

10. The computer-networked system for determining a route of claim 8, wherein said facility is a restricted access facility, and wherein said path is for at least one of pedestrian travel and vehicular travel.

11. The computer-networked system for determining a route of claim 8, wherein said determination of a path for a said person includes:
   finding of plural said paths; and
   selection, among said plural found paths, of said found path that represents the best mathematical conformity with respect to said personal clearance rank characterizing said person.

12. The computer-networked system for determining a route of claim 11, wherein said selection of said found path that represents the best said mathematical conformity includes estimation of the average said regional clearance rank that characterizes each said found path.

13. The computer-networked system for determining a route of claim 12, wherein said selection of the found said path that represents the best said mathematical conformity includes selection of the found said path that is characterized by the average said regional clearance rank that is closest to said personal clearance rank characterizing said person.

14. The computer-networked system for determining a route of claim 8, wherein each said client is configured to communicate the determined said path for said person using said client.

15. The computer-networked system for determining a route of claim 14, wherein:
   in said database each said region is attributed with a regional designation that is informative of the spatial position of said region in said facility in three dimensions;
   the determined and communicated said path includes the regional said designation of every said region that said path at least partially intersects.

16. The computer-networked system for determining a route of claim 15, wherein said determination of said path for said person includes:
   finding of plural said paths; and
   selection, among said plural found paths, of said found path that represents the best mathematical conformity with respect to said personal clearance rank characterizing said person.

17. The computer-networked system for determining a route of claim 16, wherein said selection of the found said path that represents the best said mathematical conformity includes estimation of the average said regional clearance rank that characterizes each found said path.

18. The computer-networked system for determining a route of claim 17, wherein said selection of the found said path that represents the best said mathematical conformity includes selection of the found said path that is characterized by the average said regional clearance rank that is closest to said personal clearance rank characterizing said person.

19. The computer-networked system for determining a route of claim 15, wherein:
   said facility is a marine vessel characterized by a longitudinal centerline and plural horizontal decks;
   each said regional designation is informative of said spatial position of the corresponding said region in a horizontal dimension along the longitudinal centerline, in a horizontal dimension perpendicular to the longitudinal centerline, and in a vertical dimension indicative of one of said horizontal decks.

20. The computer-networked system for determining a route of claim 19, wherein each said regional designation is further informative as to the utilization of the corresponding said region.

* * * * *